US010151908B2

(12) United States Patent
Takahashi et al.

(10) Patent No.: US 10,151,908 B2
(45) Date of Patent: Dec. 11, 2018

(54) IMAGE ACQUISITION DEVICE AND IMAGE ACQUISITION METHOD

(71) Applicant: HAMAMATSU PHOTONICS K.K., Hamamatsu-shi, Shizuoka (JP)

(72) Inventors: Akira Takahashi, Hamamatsu (JP); Yasumoto Suzuki, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 353 days.

(21) Appl. No.: 14/903,333

(22) PCT Filed: Apr. 18, 2014

(86) PCT No.: PCT/JP2014/061084
§ 371 (c)(1),
(2) Date: Jan. 7, 2016

(87) PCT Pub. No.: WO2015/004968
PCT Pub. Date: Jan. 15, 2015

(65) Prior Publication Data
US 2016/0147053 A1     May 26, 2016

(30) Foreign Application Priority Data

Jul. 10, 2013    (JP) ................................ 2013-144639

(51) Int. Cl.
*G02B 21/06*      (2006.01)
*H04N 5/235*      (2006.01)
(Continued)

(52) U.S. Cl.
CPC .............. *G02B 21/06* (2013.01); *F21V 29/50* (2015.01); *G02B 21/086* (2013.01); *G02B 21/26* (2013.01);
(Continued)

(58) Field of Classification Search
None
See application file for complete search history.

(56) References Cited

U.S. PATENT DOCUMENTS

2006/0202036 A1*   9/2006   Wang ................. G06K 7/10722
                                                      235/462.07
2008/0291470 A1*   11/2008   Yun ...................... G01B 11/002
                                                          356/616

(Continued)

FOREIGN PATENT DOCUMENTS

JP      2005-148296      6/2005
JP      2005-250130 A    9/2005
(Continued)

OTHER PUBLICATIONS

International Preliminary Report on Patentability dated Jan. 21, 2016 for PCT/JP2014/061084.

*Primary Examiner* — Christopher S Kelley
*Assistant Examiner* — Kaitlin A Retallick
(74) *Attorney, Agent, or Firm* — Drinker Biddle & Reath LLP

(57) ABSTRACT

This image acquisition device comprises: a specimen stage on which a specimen as a target of image acquisition is to be mounted; a micro-use light source having a light emitting device and a heat dissipator for dissipating heat generated by the light emitting device, and emitting light to the specimen; an objective arranged so as to be opposed to the specimen on the stage, as a light-guide optical system for guiding an optical image of the specimen; a micro image acquisition unit configured to capture the optical image of the specimen thus guided; and a micro-use light source controller configured to control the light emitting device so as to implement the emission of light by the micro-use light source, during a standby period between image acquisition periods of capturing optical images of a plurality of specimens.

12 Claims, 11 Drawing Sheets

(51) Int. Cl.
    *H05B 33/08*     (2006.01)
    *G02B 21/26*     (2006.01)
    *H05B 37/02*     (2006.01)
    *H04N 5/225*     (2006.01)
    *F21V 29/50*     (2015.01)
    *G02B 21/36*     (2006.01)
    *G02B 21/08*     (2006.01)

(52) U.S. Cl.
    CPC ............ *G02B 21/36* (2013.01); *H04N 5/2256* (2013.01); *H05B 33/0803* (2013.01); *H05B 33/0854* (2013.01); *H05B 37/0281* (2013.01); *H04N 5/2354* (2013.01); *Y02B 20/42* (2013.01)

(56) References Cited

U.S. PATENT DOCUMENTS

2010/0277748 A1* 11/2010 Potapenko ............ G01B 11/026
                                                               356/623
2013/0295695 A1* 11/2013 Delgado ................ H01L 21/26
                                                                 438/4

FOREIGN PATENT DOCUMENTS

| JP | 2008-051773 A | 3/2008 |
|----|---------------|--------|
| JP | 2009-025549 A | 2/2009 |
| JP | 2010-072503 A | 4/2010 |
| JP | 4546741 B2 | 9/2010 |
| JP | 2012-003004 A | 1/2012 |
| JP | 4995656 B2 | 8/2012 |
| WO | WO-2012/027586 A2 | 3/2012 |

\* cited by examiner

IMAGE ACQUISITION DEVICE AND IMAGE ACQUISITION METHOD

TECHNICAL FIELD

The present invention relates to an image acquisition device and an image acquisition method for acquiring an image of a specimen.

BACKGROUND ART

In recent years, the following operation is performed in the fields of pathology: a sample of pathological tissue or the like is imaged by an imaging device mounted on a microscope, and the image thereof is taken into a computer to create image data which can be viewed on a display.

The devices described in Patent Literatures 1 and 2 are known as microscope devices of this kind. The microscope device described in Patent Literature 1 has a light emitting diode for illuminating the sample and has a controller to turn on the light emitting diode by an exposure start trigger of an imaging unit and turn off the light emitting diode by an exposure end trigger. Based on such control, the device realizes suppression of change in imaging condition due to heat generated from the light emitting diode.

The fluorescence microscope described in Patent Literature 2 has the light emitting diode for emitting light to the sample and is configured to turn on the light emitting diode for only a duration corresponding to an exposure time and thereafter turn off the diode, thereby reducing fading of the specimen and realizing power saving.

CITATION LIST

Patent Literatures

Patent Literature 1: Japanese Patent No. 4995656
Patent Literature 2: Japanese Patent No. 4546741

SUMMARY OF INVENTION

Technical Problem

Incidentally, since the device described in the foregoing Patent Literature 1 operates so as to turn on the light emitting diode by the exposure start trigger and turn off the light emitting diode by the exposure end trigger, the temperature of the light emitting diode tends to decrease in the periods other than the exposure process duration. In the case of the device of the foregoing Patent Literature 2, when a plurality of specimens are continuously observed, the light is turned out during a standby period between periods of capturing optical images of the specimens. As a result, the temperature of the light emitting device tends to decrease during the standby period.

In general, an LED tends to change the wavelength peak and intensity of emitted light, with change in temperature of the LED itself or in ambient temperature. For this reason, it is common practice to attach a heat dissipator plate for dissipating the heat generated from the LED light source. However, even with the attachment of the heat dissipator plate, the temperature of the heat dissipator plate will increase in fact due to the heat generated from the LED. Therefore, a temperature difference is made between a temperature at a point of time when the drive of the LED is started and a temperature after a lapse of a certain time. As a result, when a plurality of specimens were continuously imaged, color unevenness occurred in some cases because of the difference in wavelength peak and intensity of emitted light among the plurality of specimens.

The present invention has been accomplished in view of the above-described circumstances and it is an object of the present invention to provide an image acquisition device capable of continuously capturing optical images of specimens on a quick and stable basis, by controlling driving of the light emitting device.

Solution to Problem

In order to achieve the above object, an image acquisition device according to one aspect of the present invention comprises: (1) a stage on which a specimen as a target of image acquisition is to be mounted; (2) an illumination device having a light emitting device and a heat dissipator for dissipating heat generated by the light emitting device, the illumination device performing emission of light to the specimen; (3) a light-guide optical system including an objective arranged so as to be opposed to the specimen on the stage; (4) an imaging device configure to capture an optical image of the specimen guided by the light-guide optical system; and (5) a control unit configured to control the light emitting device so as to make the illumination device perform the emission of the light during a standby period between image acquisition periods of capturing optical images of a plurality of specimens.

An image acquisition method according to another aspect of the present invention comprises: (1) a step of mounting a specimen as a target of image acquisition on a stage; (2) a step of implementing emission of light by an illumination device having a light emitting device and a heat dissipator for dissipating heat generated by the light emitting device, and capturing an optical image of the specimen guided by a light-guide optical system including an objective arranged so as to be opposed to the specimen on the stage, by an imaging device; and (3) a step of controlling the light emitting device so as to make the illumination device perform the emission of the light during a standby period between image acquisition periods of capturing optical images of a plurality of specimens.

In the foregoing image acquisition device and image acquisition method, the illumination device emits the light to the specimen, the light-guide optical system guides the optical image of the specimen, and the imaging device performs the capturing of the optical image of the specimen. Furthermore, the control unit performs such control as to make the illumination device perform the emission of the light during the standby period between the image acquisition periods of capturing the optical images of the plurality of specimens. By this control, the temperature of the heat dissipator is kept stable at the timing of continuously capturing the optical images of the specimens and, as a result, the temperature of the light emitting device becomes stabilized. Therefore, it becomes feasible to implement quick and stable capturing of the optical images of the specimens in continuous capturing of the optical images of the specimens.

Advantageous Effect of Invention

The present invention has enabled the continuous capturing of the optical images of the specimens on a quick and stable basis, by keeping the temperature of the light emitting device stable.

DESCRIPTION OF EMBODIMENTS

Figure 1:
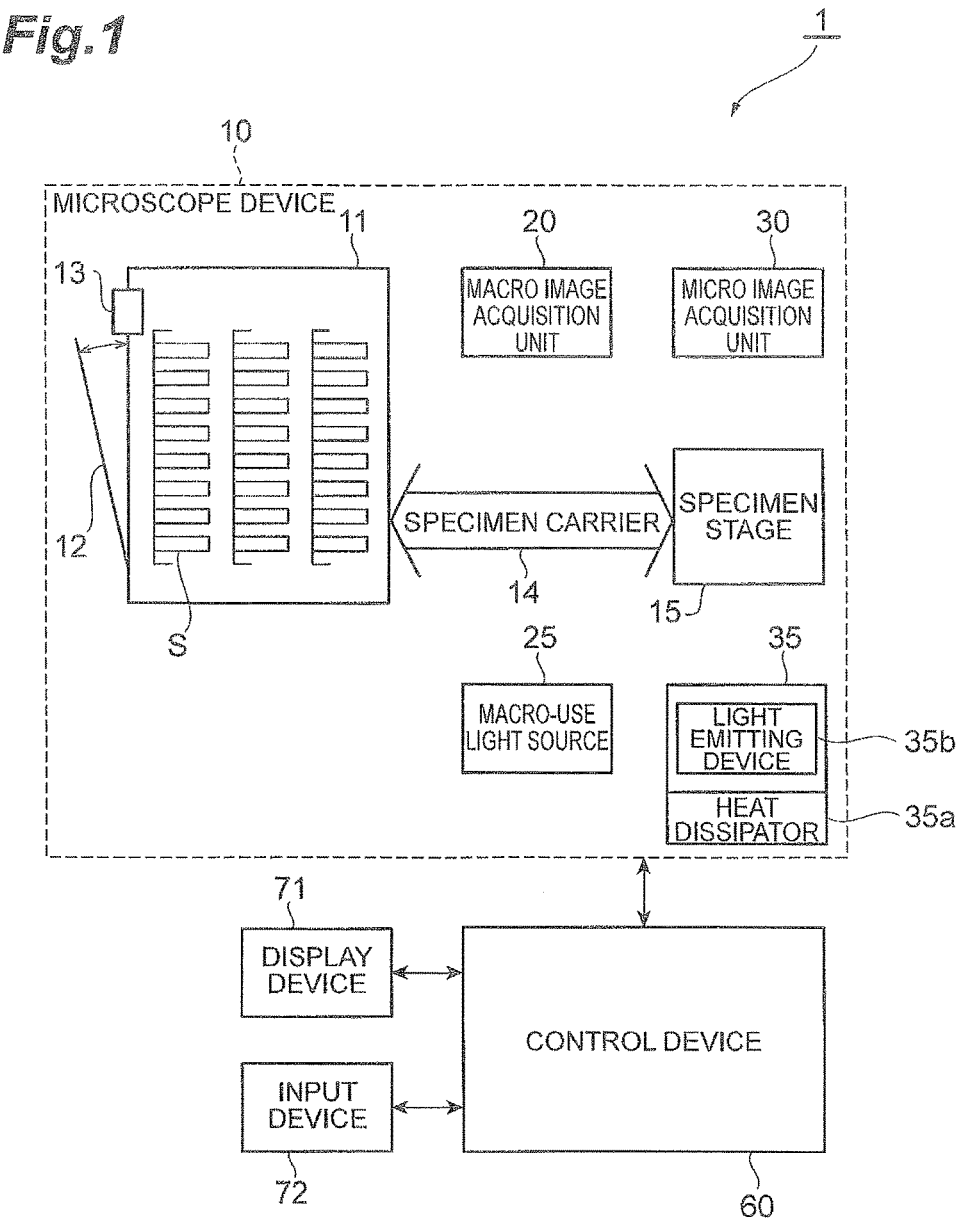
FIG. 1 is a block diagram showing a configuration of one embodiment of the image acquisition device.

Preferred embodiments of the image acquisition device according to the present invention will be described below in detail with reference to the drawings. In the description of the drawings the same elements will be denoted by the same reference signs, without redundant description. It is noted that dimensional ratios in the drawings are not always coincident with those in the description. Each of the drawings was prepared for the description and depicted with emphasis on target portions of the description. For this reason, the dimensional ratios of respective members in the drawings are not always coincident with actual ones.

First, the overall configuration of the image acquisition device 1 will be described. FIG. 1 is a block diagram showing the configuration of one embodiment of the image acquisition device according to the present invention. The image acquisition device 1 according to the present embodiment is a microscope system which is used for acquiring an image of a specimen S in high resolution, and has a microscope device 10 for performing acquisition of the image of the specimen S, and a control device 60 for performing control of the image acquisition and others in the microscope device 10. An example of the specimen S as a target of the image acquisition is a slide (preparation) in which a biological sample such as a tissue section stained with a light-absorbing dye or with a fluorochrome is enclosed in slide glass, in the case of acquiring image data to be used in a virtual microscope. The virtual microscope herein is a microscope that can digitize an image taken by an optical microscope and visualize digital data so as to allow us to view the image on a display.

The microscope device 10 has a specimen storage 11, a macro image acquisition unit 20, and a micro image acquisition unit 30. The specimen storage 11 is a storage means that is configured so as to be able to store a plurality of specimens (e.g., a plurality of slides in each of which a biological sample is enclosed) S each of which is a target of image acquisition. This specimen storage 11 is provided with a door 12 to be used, for example, for an operator to store or take out the specimen S. In the present embodiment, an interlock mechanism 13 is attached in order to prevent erroneous opening of the door 12 during image acquisition.

The macro image acquisition unit 20 is a first image acquisition means for acquiring (or capturing) a macro image being a low-magnification image (e.g., a 1×image) of an optical image of the specimen S. This image acquisition unit 20 acquires the macro image in low resolution corresponding to an entire image of the specimen S. A macro-use light source 25 for emitting light for generation of an optical image of the specimen S in macro image acquisition is installed for the macro image acquisition unit 20.

On the other hand, the micro image acquisition unit 30 is a second image acquisition means for acquiring (or capturing) a micro image being a high-magnification image of an optical image of the specimen S. This image acquisition unit 30 acquires the micro image in high resolution of the specimen S aimed. A micro-use light source 35 for emitting light for generation of an optical image of the specimen S in micro image acquisition is installed for the micro image acquisition unit 30.

The microscope device 10 is further provided with a specimen carrier 14 and a specimen stage 15 as a specimen moving means for moving the specimen S between positions in the microscope device 10. The specimen carrier 14 is a carrying means for carrying the specimen S according to need, between a storage position of the specimen S in the specimen storage 11 and an image acquisition position in each of the macro image acquisition unit 20 and the micro image acquisition unit 30. The specimen stage 15 is used for the specimen S to be mounted thereon in image acquisition of a macro image or a micro image, and used for setting, adjustment, etc. of the image acquisition position of the specimen S.

The control device 60 is a control means for performing control of image acquisition operation, setting of image acquisition condition, processing of acquired image data of the specimen S, etc. in the microscope device 10. The control device 60 is constituted, for example, of a computer including a CPU and storage devices such as a necessary memory and a hard disc. A display device 71 and an input device 72 are connected to this control device 60. The display device 71 is, for example, a CRT display or a liquid-crystal display and is used for display of a control screen necessary for the operation of this image acquisition device, or for display of the acquired image of the specimen S, or the like. The input device 72 is, for example, a keyboard or a mouse and is used for input of information necessary for the image acquisition, for input of instructions for the image acquisition operation, and so on.

Figure 2:
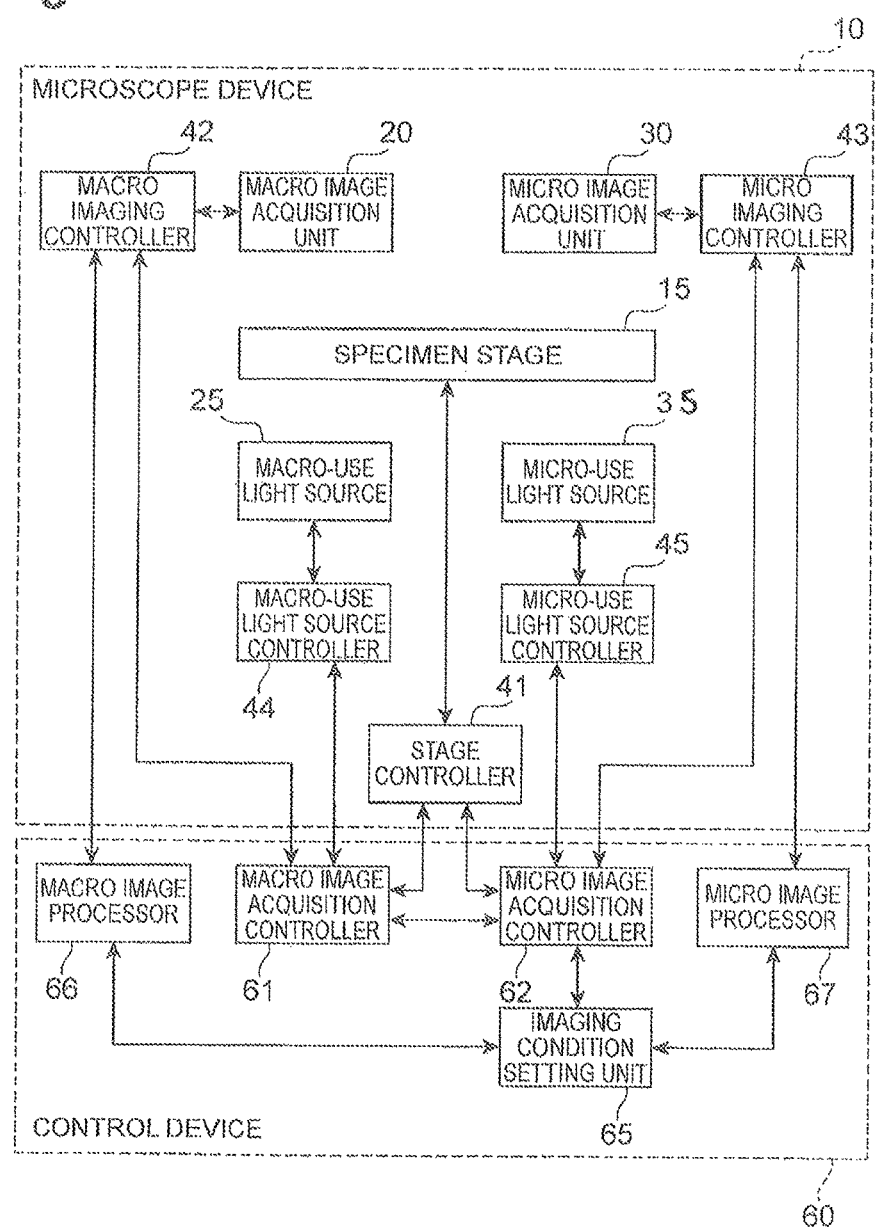
FIG. 2 is a block diagram showing an example of configurations of a microscope device and a control device shown in FIG. 1.
Figure 3:
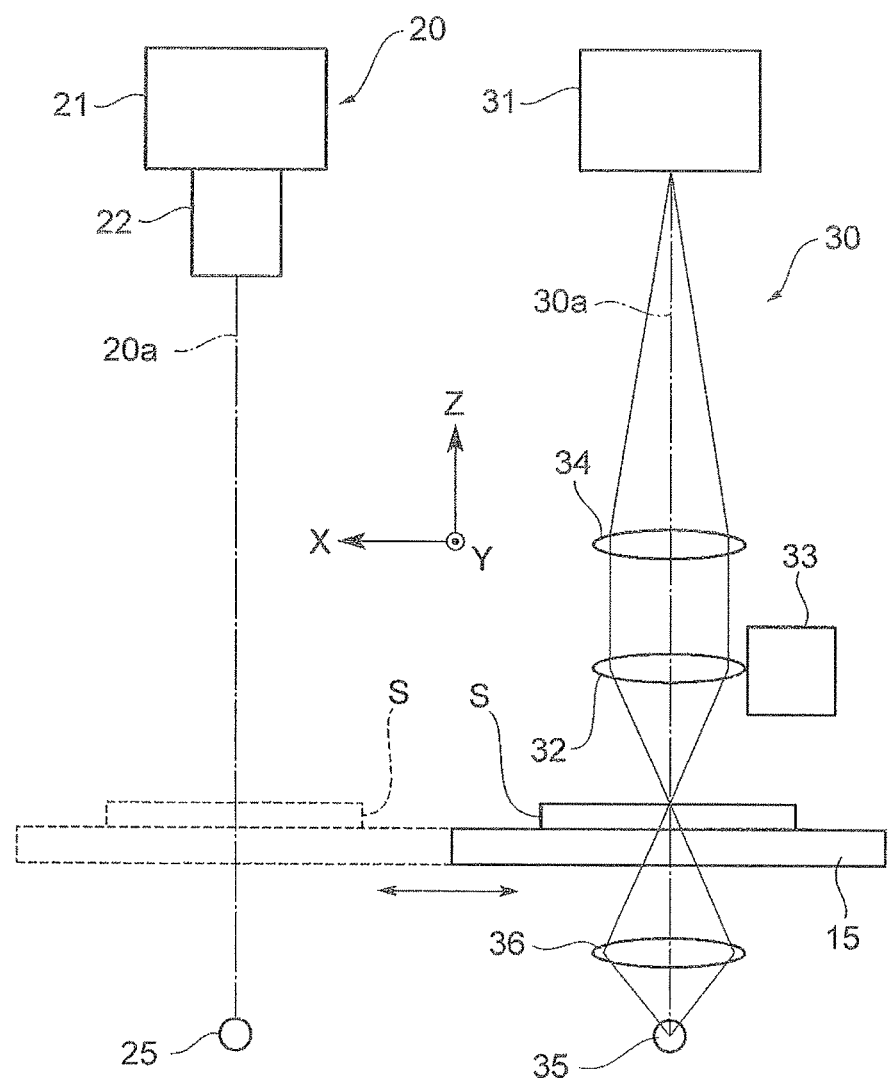
FIG. 3 is a drawing schematically showing the configuration of the microscope device in the image acquisition device.

The configuration of the image acquisition device 1 shown in FIG. 1 will be described in more detail. FIG. 2 is a block diagram showing an example of the configurations of the microscope device 10 and the control device 60 in the image acquisition device 1. FIG. 3 is a drawing schematically showing a part of the configuration of the microscope device 10. As shown in FIG. 3, the microscope device 10 of the present embodiment is configured as a transmission type microscope system to be used for acquisition of an optical image of the specimen S. As shown in the drawing, two directions perpendicular to each other as horizontal directions are defined as X-axis direction and Y-axis direction, and a vertical direction perpendicular to the horizontal directions is defined as Z-axis direction. Among these, the Z-axis direction being the vertical direction is a direction of the optical axis of image acquisition in this microscope system (direction of the optical axis of an objective). FIG. 3 mainly shows the configurations of the macro image acquisition unit 20, micro image acquisition unit 30, and light sources 25, 35, without illustration of the specimen storage 11, the specimen carrier 14, and others.

The specimen S is mounted on the specimen stage 15, in the image acquisition by the image acquisition unit 20 or 30. This specimen stage 15 is configured as an XY stage movable in the X-axis direction and Y-axis direction, using a stepping motor, a DC motor, a servo motor, or the like. In this configuration, the specimen stage 15 is driven in the XY plane, thereby to perform setting and adjustment of the image acquisition position relative to the specimen S in the image acquisition unit 20 or 30. In the present embodiment, this specimen stage 15 is movable between the image acquisition position in the macro image acquisition unit 20 and the image acquisition position in the micro image acquisition unit 30.

With respect to the macro image acquisition position for acquisition of the macro image of the specimen 5, as shown in FIG. 3, the macro image acquisition unit 20 and the macro-use light source 25 are installed at respective predetermined positions on the optical axis 20a. The macro-use light source 25 is an illumination means for emitting light for generation of an optical image for macro image acquisition, to the specimen S.

The macro image acquisition unit 20 is configured including a macro-use imaging device 21 such as a two-dimensional CCD sensor capable of acquiring a two-dimensional image based on the optical image of the specimen S. An imaging optical system 22 is provided as an optical system for guiding the optical image of the specimen S, between the macro image acquisition position where the specimen S is arranged, and the imaging device 21.

On the other hand, with respect to the micro image acquisition position for acquisition of the micro image of the specimen S, as shown in FIG. 3, the micro image acquisition unit 30 is installed at a predetermined position on the optical axis 30a. The micro image acquisition unit 30 is configured using a micro-use imaging device 31 such as an area image sensor (imaging device), e.g., a CCD image sensor or a CMOS image sensor, which is capable of acquiring a two-dimensional image based on the optical image of the specimen S. An objective 32 and a tube lens 34 arranged so as to be opposed to the specimen S on the stage are provided as a light-guide optical system for guiding the optical image of the specimen S, between the micro image acquisition position where the specimen S is arranged, and the imaging device 31. The objective 32 condenses light from the specimen S to generate the optical image of the specimen S. The tube lens 34 guides the light condensed by the objective 32, as the optical image of the specimen S to the imaging device 31.

In the present embodiment, the micro-use light source 35 (illumination device) and a condensing lens 36 are installed as an illumination means for emitting the light for generation of the optical image for the micro image acquisition, to the specimen S arranged at the micro image acquisition position. The micro-use light source 35 is constituted of a light emitting device 35b and a heat dissipator 35a for dissipating heat generated by the light emitting device 35b, to the outside. This micro-use light source 35 is arranged so as to emit the light to at least the field region of the objective 32, and the light having passed through the specimen S is condensed by the objective 32 with a high magnification such as 40× or 20× and guided to the micro image acquisition unit 30 by the tube lens 34.

As configured in this manner, the optical system for the micro image acquisition shown in FIG. 3 is constituted as a bright field microscope based on transmission illumination. In the bright field microscope of this type, the micro image acquired by the micro image acquisition unit 30 is obtained as an observation image made by the light having passed through the specimen S.

The objective 32 is equipped with a Z-stage 33 using a stepping motor or a piezo actuator or the like, and the objective 32 is driven in the Z-axis direction by this Z-stage 33, thereby enabling focusing to the specimen S or the like.

This imaging device 31 for the micro image acquisition is preferably configured using an imaging device capable of acquiring a color image, e.g., a three-sensor type image sensor camera or a color filter image sensor capable of imaging, for example, red and green, and blue light. The imaging device 21 for the macro image acquisition may be configured using either an imaging device for acquisition of a monochrome image or an imaging device capable of acquiring a color image as occasion may demand. If the imaging device 31 does not have to acquire a color image, it may also be configured using an imaging device for acquisition of a monochrome image.

For these specimen stage 15, macro image acquisition unit 20, micro image acquisition unit 30, macro-use light source 25, and micro-use light source 35, there are a stage controller 41, a macro imaging controller 42, a micro imaging controller 43, a macro-use light source controller 44, and a micro-use light source controller 45 provided as control means for controlling driving of them. The stage controller 41 controls driving of the specimen stage 15 being the XY stage, and the Z-stage 33, thereby performing setting, adjustment, and others of the imaging condition for the specimen S.

The macro imaging controller 42 controls driving of the image acquisition unit 20 including the macro-use imaging device 21, thereby controlling the macro image acquisition of the specimen S. The micro imaging controller 43 controls driving of the image acquisition unit 30 including the micro-use imaging device 31, thereby controlling the micro image acquisition of the specimen S. The macro-use light source controller 44 controls driving of the macro-use light source 25, thereby controlling the emission of the light in acquisition of the macro image of the specimen S. The micro-use light source controller 45 controls driving of the micro-use light source 35, thereby controlling the emission of the light in acquisition of the micro image of the specimen S. The details will be described later.

The control device 60 has an image acquisition control unit including a macro image acquisition controller 61 and a micro image acquisition controller 62, an image data processing unit including a macro image processor 66 and a micro image processor 67, and an imaging condition setting unit 65. The image acquisition control unit controls the image acquisition operation of the specimen S in the microscope device 10, through the above-described controllers 41-45.

The image processors 66, 67 accept input of image data of the macro image acquired by the image acquisition unit 20 and image data of the micro image acquired by the image acquisition unit 30, and perform data processing necessary for these image data. The image data input to the image processors 66, 67, various kinds of data and information obtained by the processing of the image data, control information to be used in the image acquisition controllers 61, 62, or the like is stored and retained, in a data storage unit such as a memory unit in the control device 60 as occasion may demand.

Specifically, the macro image acquisition controller 61 controls the setting operation of the macro image acquisition position of the specimen S, the acquisition operation of the macro image by the macro image acquisition unit 20, and the emission operation of the light for the macro image acquisition by the macro-use light source 25, through the stage controller 41, the macro imaging controller 42, and the macro-use light source controller 44.

The micro image acquisition controller 62 controls the setting operation of the micro image acquisition position of the specimen S, the acquisition operation of the micro image by the micro image acquisition unit 30, and the emission operation of the light for the micro image acquisition by the micro-use light source 35, through the stage controller 41, the micro imaging controller 43, and the micro-use light source controller 45. Furthermore, the micro image acquisition controller 62 controls the acquisition of the micro image of the specimen S, with reference to the imaging condition set by an imaging condition setting unit 65 described below.

The macro image processor 66 accepts input of the image data of the macro image of the specimen S acquired by the imaging device 21 of the macro image acquisition unit 20, through the macro imaging controller 42. This image processor 66 executes necessary data processing such as correction, processing, and storage for the input image data of the macro image. In the present embodiment, the macro image processor 66 has a function to perform a predetermined processing treatment for the image data of the macro image, to generate a reference macro image.

The micro image processor 67 accepts input of the image data of the micro image of the specimen S acquired by the imaging device 31 of the micro image acquisition unit 30, through the micro imaging controller 43. This image processor 67 executes necessary data processing such as correction, processing, and storage for the input image data of the micro image as the image processor 66 does. In the present embodiment, the micro image processor 67 has a function to create specimen data as high-resolution image data of the specimen S aimed, using the acquired image data of the micro image.

The imaging condition setting unit 65 is a setting means for setting the imaging condition of the micro image with reference to the macro image of the specimen S acquired by the macro image acquisition unit 20 of the microscope device 10. In the present embodiment, this imaging condition setting unit 65 accepts input of the reference macro image generated by the processing treatment of the image data of the macro image, from the macro image processor 66. Then the imaging condition setting unit 65 refers to this reference macro image to set image acquisition ranges depending upon a range including a target of image acquisition, as the imaging condition of the micro image of the specimen S. Furthermore, the imaging condition setting unit 65 sets another imaging condition according to need, e.g., focus-related information such as focus measurement positions for execution of focusing, or focus information on image acquisition of the target in the image acquisition range.

Figure 4:
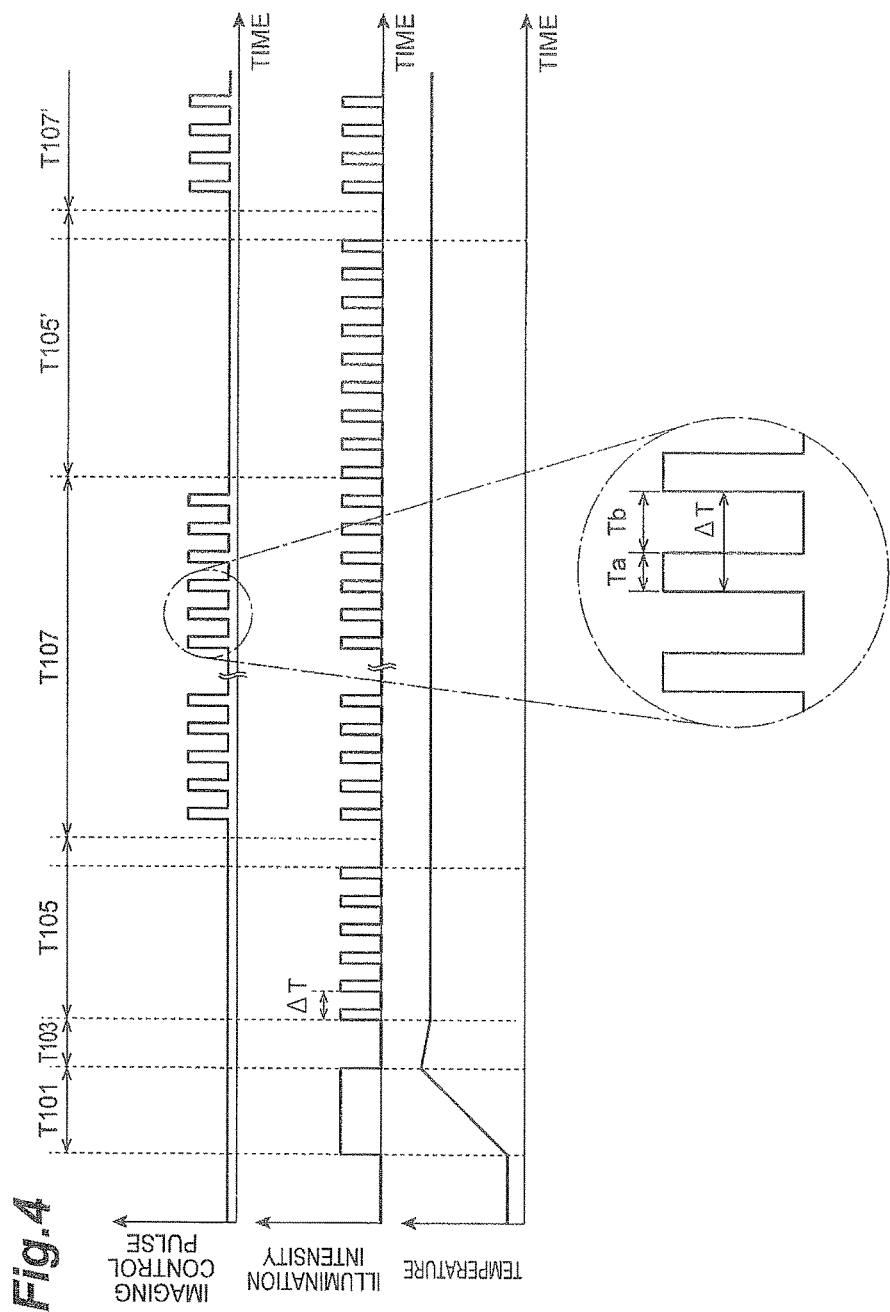
FIG. 4 is a timing chart diagram schematically showing a relationship among imaging timing, imaging control pulses, illumination intensity, and temperature in a basic operation of the image acquisition device.

Next, the detailed operation of the light source control for the micro image acquisition by the image acquisition device 1 will be described with reference to FIG. 4. FIG. 4 is a timing chart showing imaging timing by the imaging device 31 of the micro image acquisition unit 30 in the micro image acquisition, and temporal changes in illumination intensity of the light emitting device 35b and in temperature of the light emitting device 35b in conjunction with the imaging timing.

During a fixed period (warmup period) T101 immediately after a start-up of the image acquisition device 1, the micro-use light source controller 45 controls the micro-use light source 35 so as to emit the light with a predetermined irradiation intensity, for a warmup (warming up). At this time, in order to fully warm the heat dissipator 35a up, the light emitted during the warmup period T101 is set at the intensity higher than an intensity of light during an image acquisition period T107 to acquire the micro image with the specimen S being arranged at the micro image acquisition position, after the period T101. Because of this setting, the temperature of the heat dissipator 35a immediately after the warmup period T101 becomes higher than an optimum temperature of the heat dissipator 35a during the image acquisition period T107. The emission timing of the light emitting device 35b during this period may be continuous or intermittent.

Thereafter, the micro-use light source controller 45 controls the micro-use light source 35 so as to turn off the light source during a predetermined period (cool-down period) T103 immediately after the warmup period T101, in order to cool down the heat dissipator 35a with the temperature raised by the warmup, to a desired temperature. In this regard, the device may be configured in such a manner that the heat dissipator 35a is equipped with a temperature sensor and that the micro-use light source controller 45 controls the micro-use light source 35 so as to turn off the light source until the heat dissipator 35a reaches the predetermined temperature, based on a detection signal of the temperature sensor. Furthermore, the micro-use light source controller 45 may set the cool-down period T103 as a period preliminarily calculated based on an amount of heat emitted from the light emitting device 35b and an amount of heat dissipated by the heat dissipator 35a during the warmup period T101.

Next, during a period (standby period) T105 after the cool-down period T103 and before the first specimen S (e.g., slide glass on which a cellular preparation is arranged) before the image acquisition by the micro image acquisition unit 30 is arranged at the micro image acquisition position by the specimen stage 15, the micro-use light source controller 45 controls the light emitting device 35b of the micro-use light source 35 so as to emit the light. Because of this control, at any point of time when the specimen S is introduced after the cool-down period T103, the temperature of the heat dissipator 35a at that point can be kept stable, and thus the image acquisition of the first specimen S can be performed on a quick and stable basis. The specific control of the micro-use light source 35 at this time and operation of the micro-use light source 35 during the image acquisition period T107 will be described below.

During a standby period T105' after the image acquisition of the first specimen S and before the second specimen S is arranged at the micro image acquisition position by the specimen stage 15, the micro-use light source controller 45 controls the micro-use light source 35 so as to emit the light, in the same manner as during the standby period T105. Because of this control, at any point of time when the next specimen S is introduced after the image acquisition period T107 for capturing of the preceding specimen S, the temperature of the heat dissipator 35a at that point can be kept stable, and thus the continuous image acquisition of a plurality of specimens S can be performed on a quick and stable basis. Specific illumination control at this time will be described below.

Figure 5:
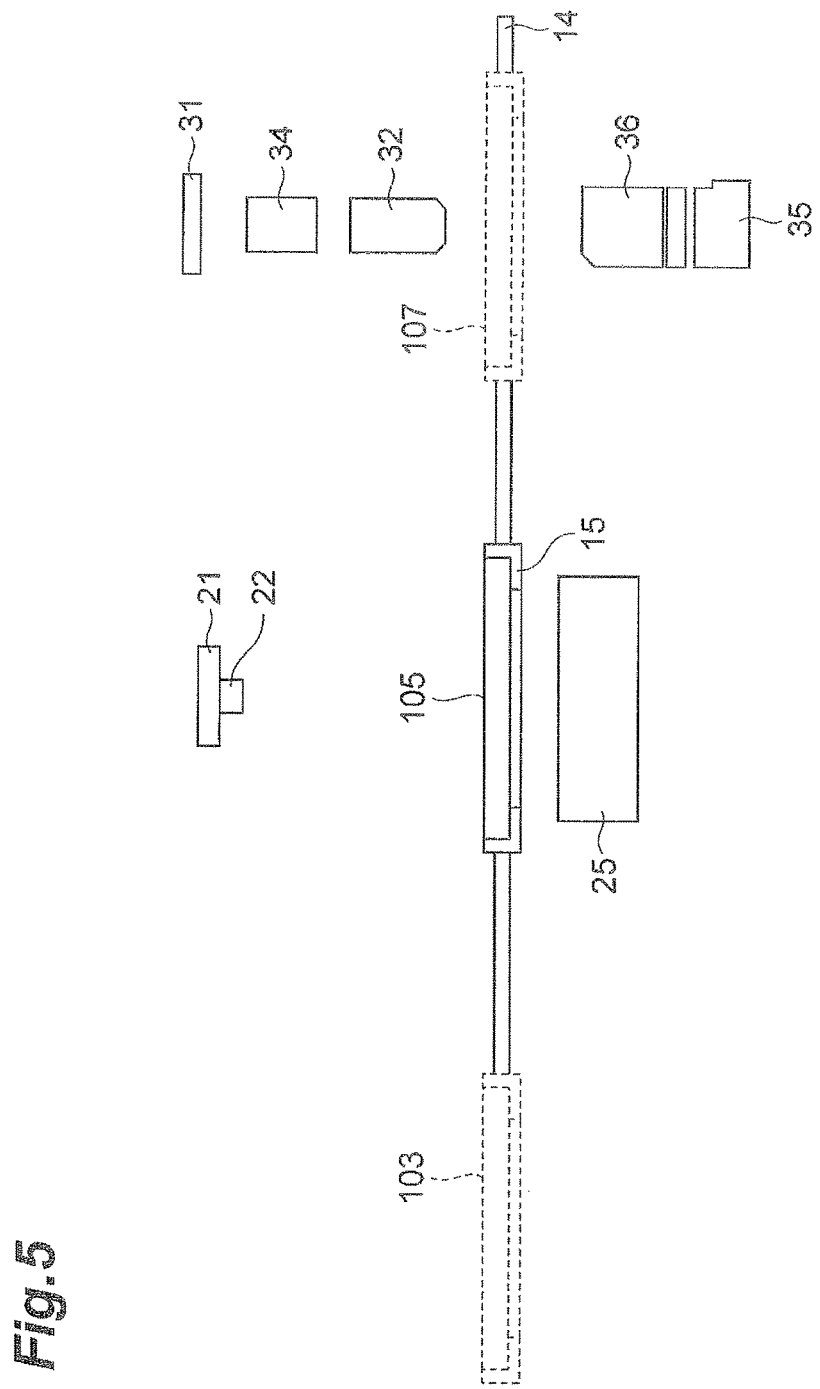
FIG. 5 is a drawing schematically showing an operation of the microscope device of the image acquisition device during an image acquisition period.

Now, the operation of the image acquisition device 1 during the image acquisition period T107 according to the image acquisition method in the present embodiment will be described in detail, while also referring to FIG. 5. FIG. 5 is an image diagram showing an operating state of the microscope device 10 before and after the image acquisition period T107. The specimen S taken out of the specimen storage 11 is mounted on the specimen stage 15 (mounting step). The specimen stage 15 is moved from an introduction position 103 to a macro image acquisition position 105 by the specimen carrier 14. Then, the macro image of the specimen S is acquired by the macro-use imaging device 21 and the imaging condition setting unit 65 (FIG. 2) sets an image acquisition range and a plurality of focus measurement positions in the image acquisition range as imaging conditions of micro images, based on the macro image. Thereafter, the specimen stage 15 is moved from the macro image acquisition position 105 to a micro image acquisition position 107 by the specimen carrier 14, and the micro-use imaging device 31 acquires focal point information at the focus measurement position, and performs focusing based on the focal point information and capturing, thereby acquiring a micro image in the image acquisition range (imaging step). At this time, partial image acquisition ranges are set by dividing the image acquisition range into a plurality of regions and the micro image is acquired for each of the plurality of partial image acquisition ranges; for this purpose, the micro image acquisition controller 62 (FIG. 2) finely adjusts the position of the specimen stage 15 and, at the same time as it, the controller 62 adjusts the position of the Z-stage 33 (FIG. 3), thereby implementing focusing on the specimen S. After completion of acquisition of the micro images in all the partial image acquisition ranges, the specimen S is moved back to the introduction position 103 and taken into the specimen storage 11. Thereafter, the next specimen S is introduced to the introduction position 103 and then the macro image thereof is taken during the standby period T105'; thereafter, acquisition of micro images of the specimen S is carried out during the next image acquisition period T107'. The image acquisition is repeatedly carried out in this manner for a plurality of specimens S.

Figure 6:
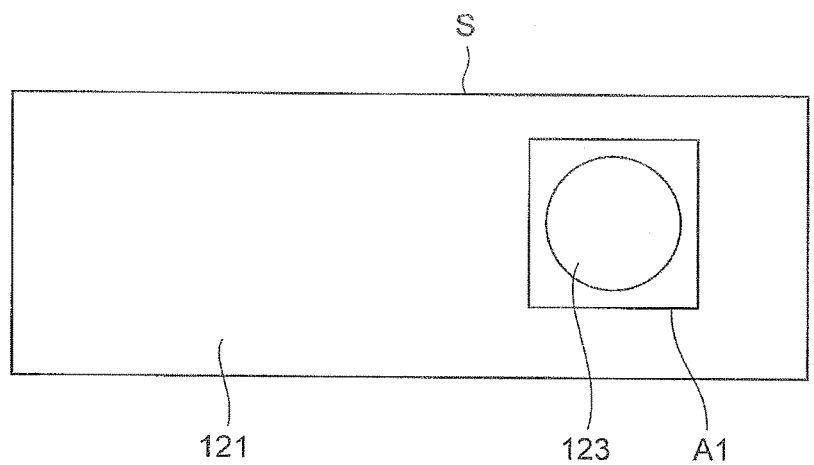
FIG. 6 is a drawing schematically showing a positional relation of a specimen with an image acquisition range and a cellular preparation.

Furthermore, the following will describe the details of the imaging condition of micro images set according to the macro image acquired by the control device 60. FIG. 6 is a drawing schematically showing the positional relationship of the specimen with the image acquisition range and cellular-preparation. FIG. 6 shows the acquisition range of the macro image acquired in the specimen S by the control device 60. The same drawing shows an example of the specimen S in which the cellular preparation 123 is mounted on slide glass 121, the macro image of this whole specimen S is acquired, and the image acquisition range A1 is set so as to include the cellular preparation 123, with reference to the macro image. For example, the size of the slide glass 121 is approximately 25 mm×75 mm, whereas the size of the acquisition range A1 of micro images covering the cellular preparation 123 is approximately 15 mm>15 mm.

Figure 7:
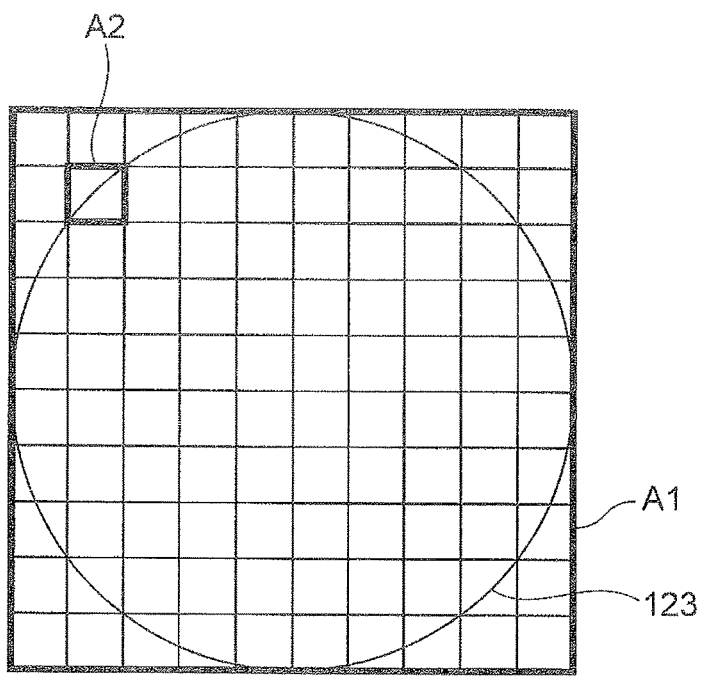
FIG. 7 is a drawing schematically showing a setting of micro image acquisition condition.

FIG. 7 shows an image of the image acquisition ranges of micro images (partial image acquisition ranges) set in the micro image acquisition control unit 62 (FIG. 2) for the image acquisition range A1 set by the control device 60. As shown in the same drawing, the imaging condition setting unit 65 sets a plurality of partial image acquisition ranges A2 for acquisition of micro images, based on the set image acquisition range A1, so as to segment the image acquisition range A1 enclosing the cellular preparation 123, while including the whole of the range A1. Specifically, for the rectangular image acquisition range A1, the partial image acquisition ranges A2 are set so as to divide the acquisition range A1 into a plurality of rectangular image acquisition ranges A2 of micro images of the same area, according to the imaging field of the objective 32. These partial image acquisition ranges A2 correspond to imaging fields of micro images and, during the image acquisition period T107, they are referred to by the micro image acquisition control unit 62 in the operation of finely adjusting the position of the specimen stage 15. The partial image acquisition ranges A2 may be set in contact with each other in the image acquisition range A1, or may be set so as to partly overlap with each other.

Furthermore, the imaging condition setting unit 65 sets the focus-related information for the image acquisition range A1. The focus information is, for example, a focus map. For creating the focus map, a plurality of focus measurement positions are first set in the image acquisition range A1. Then, the micro image acquisition device 30 measures the focal point information at each of the focus measurement positions (e.g., heights of the objective 32 in an in-focus state or spaces between the objective 32 and the stage 15) and the focus map is created by a calculation means such as the least-square method, based on a plurality of pieces of focal point information thus measured.

Referring back to FIG. 4, the below will detail the micro image acquisition control and the control of the micro-use light source 35 (control in the control step) by the control device 60 during the image acquisition period and during the standby period.

First, during the image acquisition period T107 or T107', the specimen stage 15 is moved by control of the micro image acquisition controller 62 so that the partial image acquisition range A2 to be first subjected to image acquisition is included in the field of the objective 32. After completion of the movement, the micro image acquisition controller 62 adjusts the spacing between the objective 32 and the specimen S, based on the focus information for the partial image acquisition range A2. Then, the micro image acquisition controller 62 feeds an imaging control pulse to control the imaging (exposure) timing, to the micro-use imaging device 31, and the micro-use imaging device 31 acquires the micro image of the partial image acquisition range A2. Furthermore, the specimen stage 15 is moved so that the next partial image acquisition range A2 is included in the field of the objective 32; the spacing between the objective 32 and the specimen S is adjusted based on the focus information; thereafter an imaging control pulse is fed from the micro image acquisition controller 62 to the micro-use imaging device 31, thereby acquiring the micro image of the next image acquisition range A2. In this manner, a movement duration Ta of the specimen stage 15 and an imaging duration Tb of the micro image are alternately repeated for all of the partial image acquisition ranges A2.

During the image acquisition period T107 or T107', at the same time as above, the micro image acquisition controller 62 feeds control pulses at the same timing and cycle as the imaging control pulses, to the micro-use light source controller 45. In response thereto, the micro-use light source 35 starts emission of light at a rise of each input control pulse and ends the emission of the light at a fall of each control pulse. In this manner, the controller performs such control as to intermittently perform the emission of light by the micro-use light source 35 in accordance with the movement timing of the specimen stage 15 and the acquisition timing of the micro images of the partial image acquisition ranges A2.

During the standby period T105 or T105', the micro-use light source 35 is controlled so as to intermittently emit the light, based on control by the micro image acquisition controller 62. At this time, the micro-use light source 35 is controlled based on the control by the micro image acquisition controller 62 so as to implement intermittent lighting (pulsed lighting) during the standby period T105, T105' in the same cycle as that of the imaging control pulses during the image acquisition period T107, T107'. By such pulsed lighting, the temperature of the light emitting device 35b can be kept stable, while suppressing the increase in temperature of the light emitting device 35b.

Specifically, during the standby period T105, T105', the pulsed lighting of the micro-use light source 35 is controlled so that an irradiance level (average intensity) of light per unit time is approximately equal to that during the image acquisition period T107, T107' for acquisition of the micro image. More preferably, the cycle $\Delta T$ of the pulsed lighting is set so as to be equal to the imaging cycle of the plurality of partial image acquisition ranges A2, i.e., the sum of the length of the movement duration Ta between partial image acquisition ranges A2 and the length of the imaging duration Tb of the micro image, and the intensity and lighting duration of the pulsed lighting are set so as to be equal to the intensity of light emitted for the imaging duration Tb and the length of the imaging duration, respectively. Since this makes the amount of heat generated from the light emitting device 35b during the standby period T105, T105' approximately equal to that during the image acquisition period T107, T107', the temperature of the light emitting device 35b can be kept stable. However, it should be noted herein that as long as the average intensity is approximately equal to that during the image acquisition period T107, T107' for acquisition of the micro image, the cycle and lighting conditions (lighting duration and light intensity) of the pulsed lighting may be changed.

The processing corresponding to the image acquisition method executed in the image acquisition device 1 shown in FIG. 1 can be realized by an image acquisition program for letting a computer execute the image acquisition process. For example, the control device 60 in the image acquisition device 1 can be constituted of a CPU for running each of software programs necessary for the image acquisition process, a ROM storing the software programs, and a RAM temporarily storing data during execution of the programs. In this configuration, the CPU executes a predetermined image acquisition program, thereby realizing the aforementioned image acquisition device 1 and image acquisition method.

The foregoing programs for letting the CPU execute each of the processes for image acquisition of the specimen can be distributed as recorded in a computer-readable recording medium. Examples of such recording media include magnetic media such as hard discs and flexible discs, optical media such as CD-ROMs and DVD-ROMs, magnetooptic media such as floptical discs, or hardware devices, e.g., such as the RAM, ROM, and semiconductor nonvolatile memories, which are especially arranged to execute or store program commands.

By the control of the micro-use light source 35 in the image acquisition device 1 described above, the temperature of the micro-use light source 35 including the heat dissipator 35a is kept stable at the timing of capturing the micro image of the specimen S and, as a result, the temperature of the light emitting device 35b becomes stabilized. Therefore, the imaging condition is stabilized during the continuous imaging of the plurality of specimens S, which enables quick and stable capturing of the optical images of the specimens.

Since the micro-use light source 35 is controlled so as to implement the intermittent illumination during the standby period, it becomes feasible to effectively suppress the increase in temperature of the heat dissipator 35a and keep the temperature of the heat dissipator 35a stabler.

Since the average intensity of the emission of light from the micro-use light source 35 during the standby period is controlled so as to be equal to that during the image acquisition period, the temperature of the heat dissipator 35a during the standby period between the image acquisition periods for capturing the micro images of the specimens S can be kept approximately equal to that during the image acquisition period for taking the micro images. As a result, the imaging can be performed under the same condition at any timing of imaging of the specimen S, which can reduce the color unevenness among images.

Since the emission of light from the micro-use light source 35 during the standby period is controlled based on the movement duration of the stage during image acquisition period and on the intensity of the illumination light and the imaging duration during capturing of the optical image during the image acquisition period, it becomes feasible to readily control the temperature of the heat dissipator 35a so as to be uniformized in the relation between that during the standby period and that during the image acquisition period. Specifically, since the duty ratios of the control pulses of the light emitting device 35b are controlled so as to be equal between those during the image acquisition period and those during the periods before and after it, the temperature of the light emitting device 35b and ambient temperature around it during the image acquisition period can be stabilized, and thus the micro images can be obtained with the same uniformity. For this reason, it is feasible to provide a synthetic image of the specimen S without giving a viewer a feeling of strangeness.

It should be noted that the present invention is by no means intended to be limited to the above-described embodiment.

Figure 8:
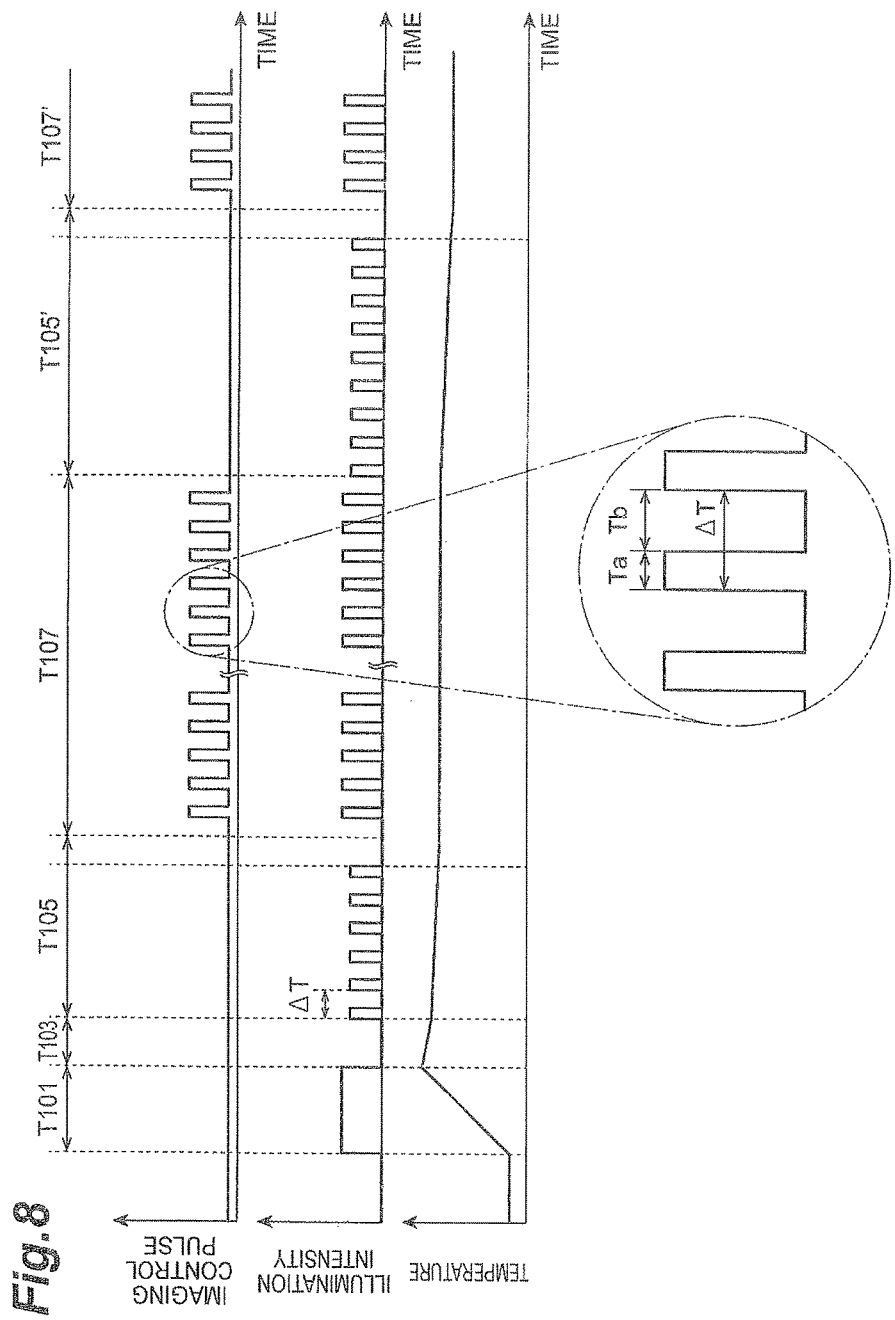
FIG. 8 is a timing chart diagram schematically showing a relationship among imaging timing, imaging control pulses, illumination intensity, and temperature in the image acquisition device according to a modification example.

For example, FIG. 8 is a chart diagram schematically showing the relationship among imaging timing, imaging control pulses, illumination intensity, and temperature in the image acquisition device according to a modification example. As shown in FIG. 8, the light intensity of the micro-use light source 35 during the standby period controlled by the control device 60 may be different from that during the image acquisition period. Namely, the control device 60 according to the modification example of the present invention performs such control that the cycle $\Delta T$ of the pulsed lighting and the lighting duration of one lighting time of the micro-use light source 35 are the same but the light intensity of the pulsed lighting during the standby period T105, T105' is lower than that during the image acquisition period T107, T107'. Alternatively, the light intensity of the pulsed lighting during the standby period T105, T105' may be set higher than that during the image acquisition period T107, T107'. Preferably, the control device 60 sets the average intensity during the standby period T105, T105' between 60% and 140% of the average intensity during the image acquisition period T107, T107'. This allows the temperature of the light emitting device 35b to be kept stable. It is also possible to modify the cycle ΔT of the pulsed lighting and the lighting duration of one pulsed lighting time.

Figure 9:
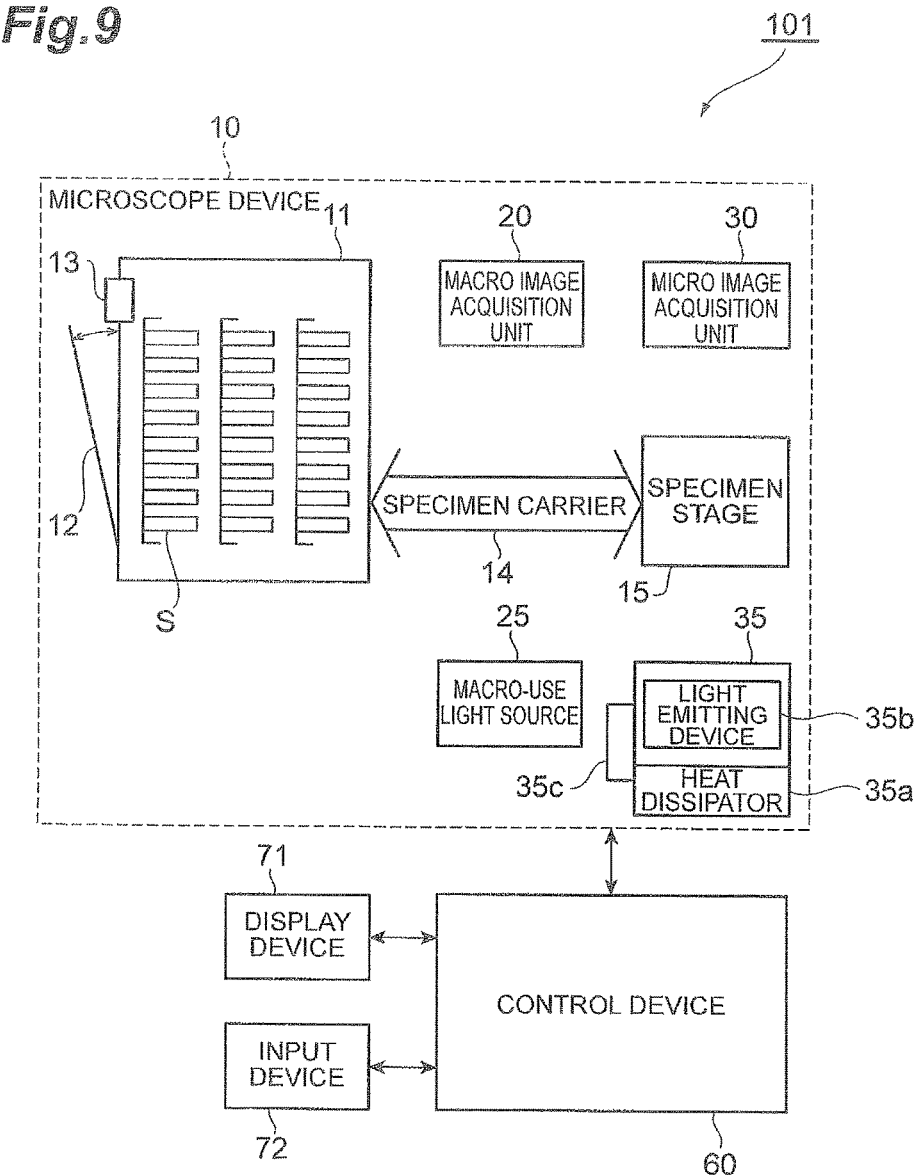
FIG. 9 is a block diagram of a configuration in the image acquisition device according to a modification example.
Figure 10:
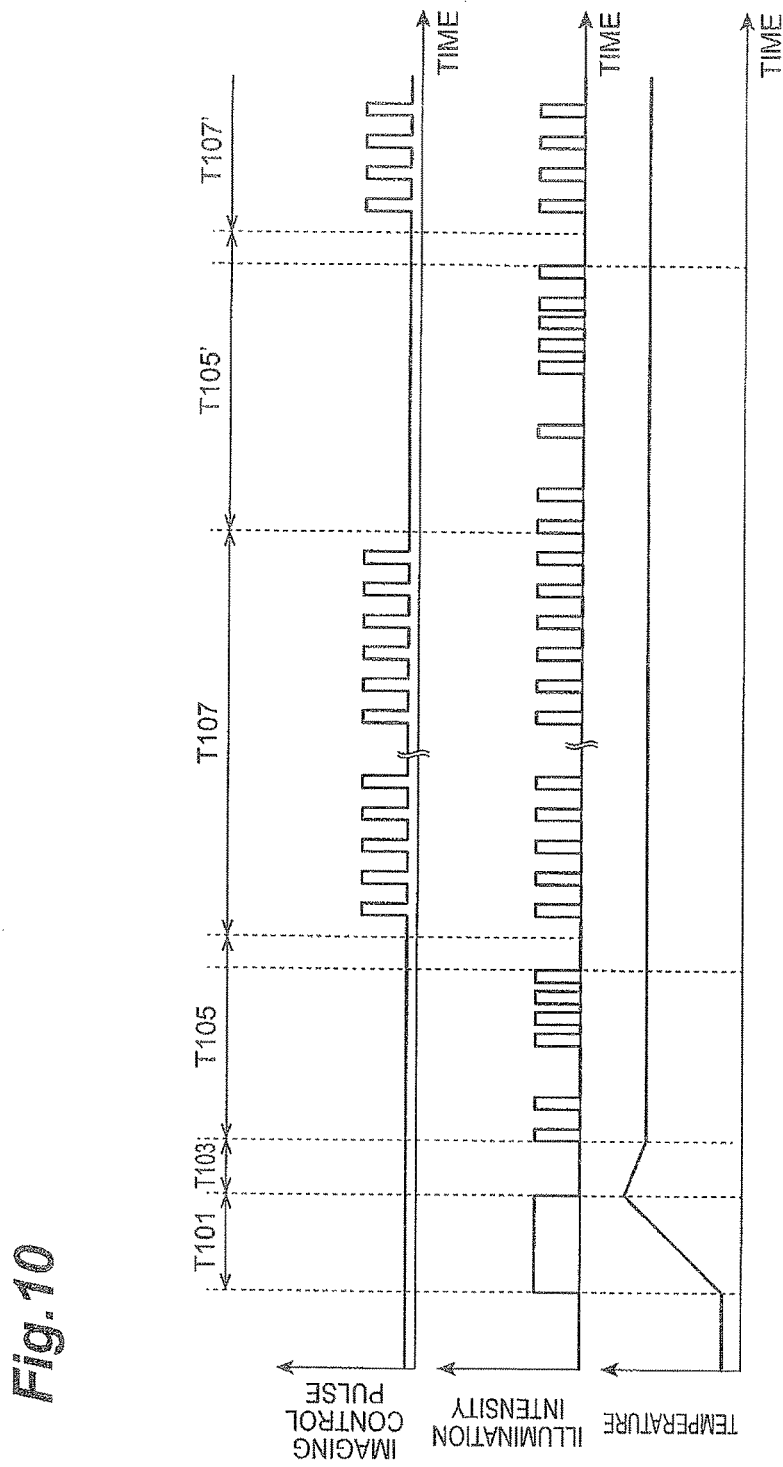
FIG. 10 is a timing chart diagram schematically showing a relationship among imaging timing, imaging control pulses, illumination intensity, and temperature in the image acquisition device according to another modification example.

Furthermore, FIG. 10 is a chart diagram schematically showing the relationship among imaging timing, imaging control pulses, illumination intensity, and temperature in the image acquisition device according to another modification example. In this case, like the image acquisition device 101 according to a modification example of the present invention shown in FIG. 9, the image acquisition device may be configured so that a temperature sensor 35c is attached near the heat dissipator 35a of the micro-use light source 35 and that the light emission from the light emitting device 35b is controlled based on output of the temperature sensor 35c. Namely, the temperature sensor 35c detects change in temperature of the heat dissipator 35a during the standby period T105, T105' and the control device 60 controls the emission of light by turning the micro-use light source 35 on and off according to the temperature change of the heat dissipator 35a (FIG. 10). As described above, since the control of the light emission is performed based on the temperature of the light emitting device 35b detected by the temperature sensor 35c, the temperature of the light emitting device 35b can be kept stable between the image acquisition period T107, T107' and the standby period T105, T105', even with variation in ambient temperature. As a result, the macro image can be taken under the same imaging condition even with introduction of the specimen S at any timing; for this reason, uniformity can be kept unchanged among the micro images.

Figure 11:
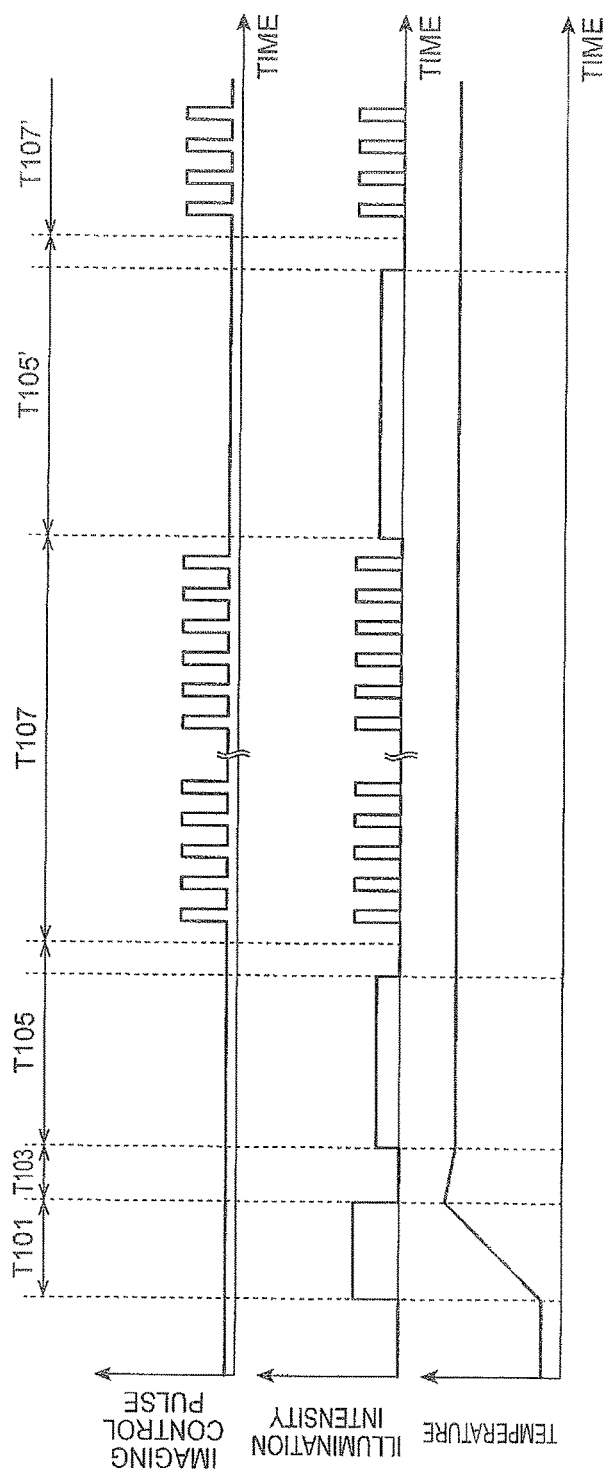
FIG. 11 is a timing chart diagram schematically showing a relationship among imaging timing, imaging control pulses, illumination intensity, and temperature in the image acquisition device according to still another modification example.

Furthermore, FIG. 11 is a chart diagram schematically showing the relationship among imaging timing, imaging control pulses, illumination intensity, and temperature in the image acquisition device according to another modification example. As shown in FIG. 11, the control device 60 may control the micro-use light source 35 so as to continuously emit the light during the standby period T105, T105'. At this time, the control device 60 according to the modification example of the present invention may perform such control that the average intensity during the standby period T105, T105' is equal to or different from that during the image acquisition period T107, T107'. The image acquisition device may be configured by adopting the same configuration as the configuration shown in FIG. 9, and configured to operate in such a manner that the temperature sensor 35c detects the temperature of the heat dissipator 35a and that the intensity of the light emitted from the micro-use light source 35 is controlled according to the temperature. This configuration facilitates the control of the micro-use light source 35 and allows the temperature of the light emitting device 35b to be effectively kept stable.

In the image acquisition device according to one aspect of the present invention, the control unit preferably controls the light emitting device so that the emission of the light by the illumination device during the standby period between the image acquisition periods of capturing the optical images of the specimens is intermittent illumination. By implementing such intermittent illumination, it becomes feasible to effectively suppress the increase in temperature of the heat dissipator and keep the temperature of the heat dissipator stabler.

In the image acquisition device according to one aspect of the present invention, the light emitting device is preferably controlled so that the average intensity of the emission of the light by the illumination device during the standby period between the image acquisition periods of capturing the optical images of the specimens is equal to the average intensity during the image acquisition period. By such control, the temperature of the heat dissipator during the standby period between the image acquisition periods of capturing the optical images of the specimens can be kept approximately equal to that during the image acquisition period. As a result, the imaging operation can be performed under the same condition even if the specimen is imaged at any timing; therefore, it becomes feasible to reduce the color unevenness among the images.

In the image acquisition device according to one aspect of the present invention, the control unit preferably controls the light emitting device, based on the movement duration of the stage during the image acquisition period and the intensity and the imaging duration of the illumination light in the capturing of the optical image during the image acquisition period. By such control, the temperature of the heat dissipater can be readily controlled based on the relationship of the standby period between the image acquisition periods, with the image acquisition period.

In the image acquisition device according to one aspect of the present invention, the light emitting device may be controlled so that the light is continuously emitted by the illumination device during the standby period. By continuously emitting the light in this manner, the control of the illumination device becomes easier and the temperature of the light entitling device can be effectively kept stable.

The image acquisition device according to one aspect of the present invention preferably further comprises the temperature sensor attached to the heat dissipator and the control unit preferably controls the emission of the light from the light emitting device, based on output of the temperature sensor during the standby period. By such control, the temperature of the heat dissipator can be stabilized during the image acquisition period and during the standby period, even with variation in ambient temperature. As a result, the imaging operation can be performed under the same condition even if the specimen is introduced at any timing; therefore, it becomes feasible to reduce the color unevenness among the images.

In the image acquisition device according to one aspect of the present invention, the control is preferably performed so as to implement the emission of the light from the light emitting device, prior to the first image acquisition period. By such control, the temperature of the heat dissipator is also maintained in the imaging operation of the first specimen and, as a result, the temperature of the light emitting device is kept stable; therefore, it becomes feasible to perform the capturing of the optical image of the specimen on a quick and stable basis, for all of the specimens.

INDUSTRIAL APPLICABILITY

The present invention is applied to usage as the image acquisition device and image acquisition method for acquiring images of specimens and has enabled the continuous capturing of optical images of the specimens on a quick and stable basis, by keeping the temperature of the light emitting device stable.

REFERENCE SIGNS LIST 1 image acquisition device; 10 microscope device; 15 specimen stage; 20 macro image acquisition unit; 21 macro-use imaging device; 22 imaging optical system; 25 macro-use light source; 30 micro image acquisition unit; 31 micro-use imaging device; 32 objective; 33 stage; 34 tube lens; 35 micro-use light source; 35a heat dissipator; 35b light emitting device; 35c temperature sensor; 42 macro imaging controller; 43 micro imaging controller; 44 macro-use light source controller; 45 micro-use light source controller; 60 control device; 61 macro image acquisition controller; 62 micro image acquisition controller; 65 imaging condition setting unit; 66 macro image processor; 67 micro image processor; 101 image acquisition device; A2 image acquisition ranges; S specimen; T105 standby period; T107 image acquisition period; Ta movement duration; Tb imaging duration; ΔT cycle.

The invention claimed is:

1. An image acquisition device comprising:
 a stage on which a specimen as a target of image acquisition is to be mounted;
 an illumination device having a light emitting device and a heat dissipator for dissipating heat generated by the light emitting device, the illumination device performing emission of light to the specimen;
 a light-guide optical system including an objective arranged so as to be opposed to the specimen on the stage;
 an imaging device configured to capture an optical image of the specimen guided by the light-guide optical system; and
 a control unit configured to control the light emitting device so as to make the illumination device perform the emission of the light during a standby period between image acquisition periods of capturing optical images of a plurality of aforementioned specimens,
 wherein the control unit controls the light emitting device, based on a movement duration of the stage during the image acquisition period and on an intensity and an emission duration of the light emitted by the illumination device in the capturing of the optical image during the image acquisition period.

2. The image acquisition device according to claim 1, wherein the control unit controls the light emitting device so that the emission of the light by the illumination device during the standby period is intermittent illumination.

3. The image acquisition device according to claim 1, wherein the control unit controls the light emitting device so that an average intensity of the emission of the light by the illumination device during the standby period is equal to an average intensity during the image acquisition period.

4. The image acquisition device according to claim 1, wherein the light emitting device is controlled so that the illumination device continuously emits the light during the standby period.

5. The image acquisition device according to claim 1, further comprising a temperature sensor attached to the heat dissipator,
 wherein the control unit controls the emission of the light from the light emitting device, based on output of the temperature sensor, during the standby period.

6. The image acquisition device according to claim 1, wherein the control unit performs such control as to implement the emission of the light from the light emitting device, prior to the first image acquisition period.

7. An image acquisition method comprising:
 mounting a specimen as a target of image acquisition on a stage;
 implementing emission of light by an illumination device having a light emitting device and a heat dissipator for dissipating heat generated by the light emitting device,
 capturing an optical image of the specimen guided by a light-guide optical system including an objective arranged so as to be opposed to the specimen on the stage, by an imaging device; and
 controlling the light emitting device so as to make the illumination device perform the emission of the light during a standby period between image acquisition periods of capturing optical images of a plurality of aforementioned specimens,
 wherein the controlling controls the light emitting device, based on a movement duration of the stage during the image acquisition period and on an intensity and an emission duration of the light emitted by the illumination device in the capturing of the optical image during the image acquisition period.

8. The image acquisition method according to claim 7, wherein the controlling controls the light emitting device so that the emission of the light by the illumination device during the standby period is intermittent illumination.

9. The image acquisition method according to claim 7, wherein the controlling controls the light emitting device so that an average intensity of the emission of the light by the illumination device during the standby period is equal to an average intensity during the image acquisition period.

10. The image acquisition method according to claim 7, wherein the light emitting device is controlled so that the illumination device continuously emits the light during the standby period.

11. The image acquisition method according claim 7, wherein the heat dissipator is attached a temperature sensor, and wherein the controlling controls the emission of the light from the light emitting device, based on output of the temperature sensor, during the standby period.

12. The image acquisition method according to claim 7, wherein the controlling performs such control as to implement the emission of the light from the light emitting device, prior to the first image acquisition period.

* * * * *